United States Patent [19]

Starratt, Jr.

[11] 4,065,820
[45] Jan. 3, 1978

[54] MOLDED BOAT HULLS

[76] Inventor: Medford L. Starratt, Jr., 2015 Beach Drive, SE., St. Petersburg, Fla. 33701

[21] Appl. No.: 747,399

[22] Filed: Dec. 3, 1976

[51] Int. Cl.² ............................................. B63B 5/24
[52] U.S. Cl. ..................................................... 9/6 P
[58] Field of Search .................. 9/6 R, 6 P; 156/212, 156/228; 114/65 R; 428/58

[56] References Cited

U.S. PATENT DOCUMENTS

| 2,833,682 | 5/1958 | De Laszlo | 9/6 P X |
| 3,101,489 | 8/1963 | Chance | 9/6 P X |
| 3,773,581 | 11/1973 | Stanley | 9/6 P X |

FOREIGN PATENT DOCUMENTS 821,618  10/1959  United Kingdom ..................... 9/6 P Primary Examiner—Barry L. Kelmachter
Attorney, Agent, or Firm—Robert Henderson

[57] ABSTRACT

A molded boat hull formed of bonded laminations of fiber glass sheet material is provided with longitudinally extending reinforcing stringers comprising substantially interleaved and interbonded marginal portions of plural laminations of fiber glass sheets of which the subject boat hull is generally constituted. The reinforcing stringers also serve to inseparably interconnect adjacent ones of the fiber glass sheets.

1 Claim, 3 Drawing Figures

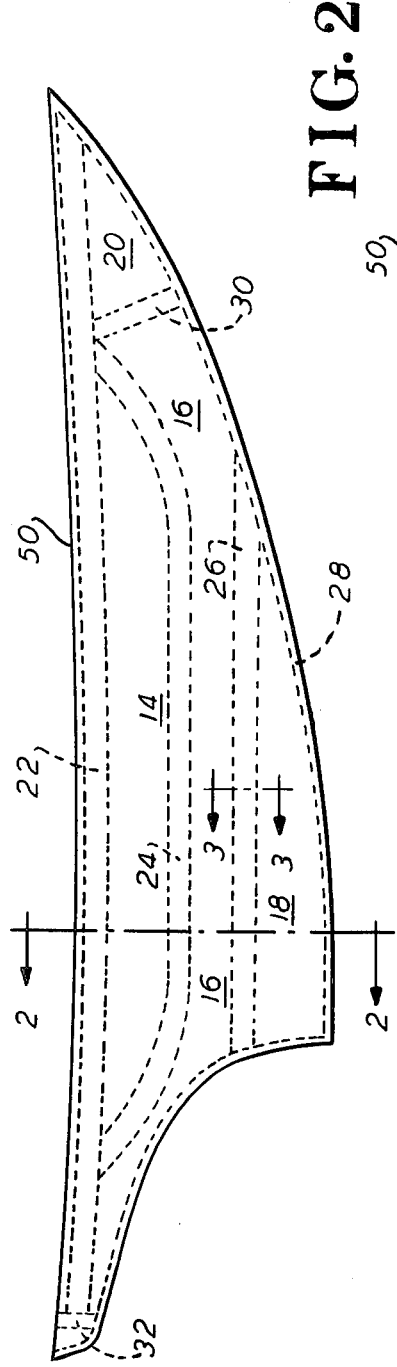
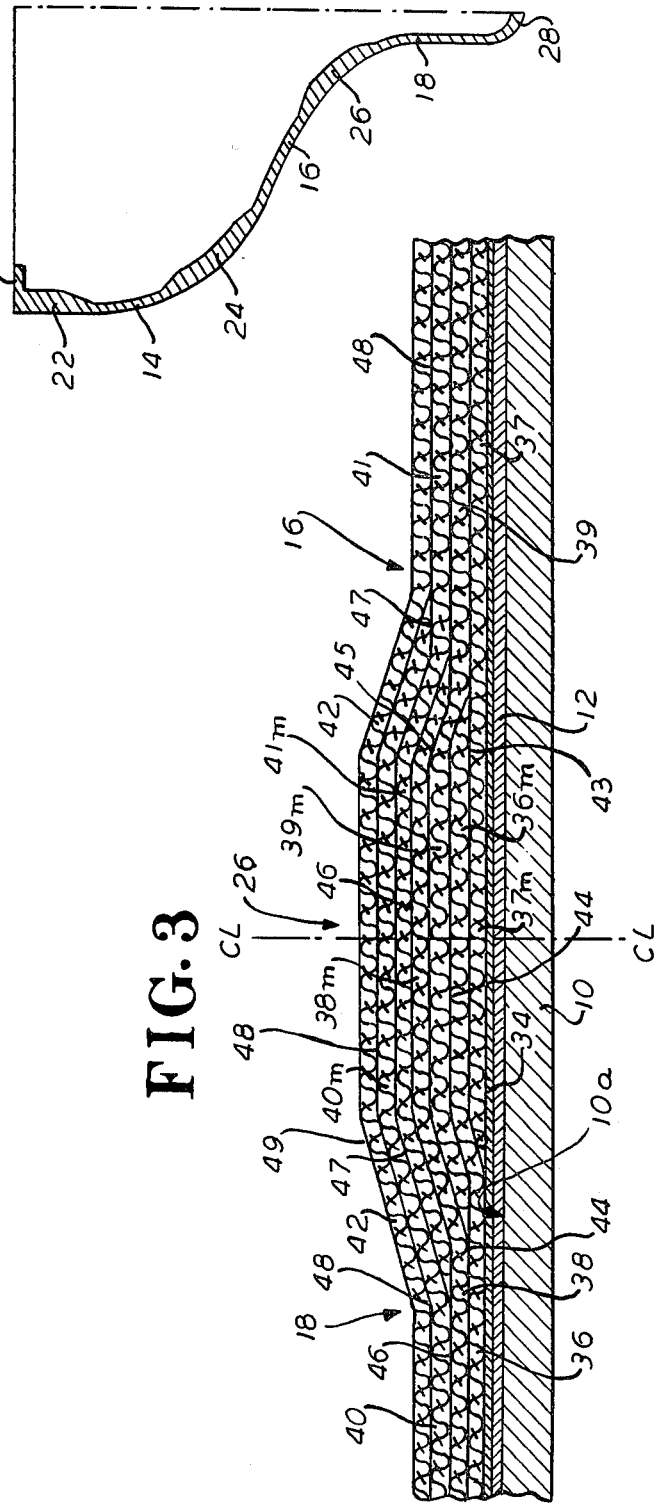

MOLDED BOAT HULLS

BACKGROUND OF THE INVENTION

It has been recognized, in the production of molded, laminated, fiber glass hulls for boats, that certain areas of a boat hull are subject to possible delamination or other structural failure arising from water stresses imposed upon such areas in the use of the boat.

Experience and engineering studies, moreover, have shown that the areas of such possible failure are generally linear in character and constitute a lesser portion of the entire area of the hull. This condition has hitherto led to the practice of providing a preliminary hull structure of relatively few laminations and a consequent relatively thin hull wall, without regard to any failure-possible areas; and thereafter applying reinforcing strips or stringers on the inner surface of the hull along the failure-possible areas.

Such reinforcing strips have been applied to the previously completed preliminary hull by bonding, subject to the shortcomings of even the best known bonding practices. One difficulty encountered with such separately applied reinforcing strips is that water stresses imposed upon the hull's areas where such strips are applied, strongly tend to cause separation of the strips from the preliminary hull, thereby defeating the reinforcing purpose of said strips.

OBJECTS OF THIS INVENTION

An important object of this invention is the provision of a laminated fiber glass boat hull wherein the greater areas thereof, being subject to little or no failure possibility, are of relatively few laminations and are relatively thin but of adequate strength for those areas, while the remaining or lesser areas of the hull, being failure-possible areas, comprise stringers which are built in as integral parts of the hull, thus avoiding the need for separately applied reinforcing stringers.

Another important object is the provision of reinforcing stringers which comprise interleaved and interbonded marginal portions of laminations of sheets of fiber glass material which are employed in generally forming the hull; such interleaving resulting in stringers which are approximately double the thickness of the greater hull areas and, thus, having the greater strength needed to prevent possible structural failure of the hull where the stringers are located.

The stated objects are derived from the present invention as set forth in the accompanying abstract and as detailed in this specification and in the claims forming a part thereof.

BRIEF DESCRIPTION OF THE DRAWING

In the accompanying drawing:

FIG. 1 is an elevational, outline view, in full lines, of one outer side of a boat hull according to this invention; showing, in broken lines, plural reinforcing stringers provided within laminated and interbonded fiber glass constituting that side of the hull. The opposite side of said hull, from prow to stern, is identical to the illustrated side in outline and in the provision of reinforcing stringers.

FIG. 2 is an enlarged, one half cross sectional view of said hull, substantially on the line 2—2 of FIG. 1; the other half of the hull, at said line, being oppositely similar to the illustrated half.

FIG. 3 is a still further enlarged and diagrammatic fragmentary cross sectional view of portions of the hull's laminations and of a reinforcing stringer formed by the interleaving and interbonding of said laminations; this sectional view being substantially on the line 3—3 of FIG. 1.

DETAILED DESCRIPTION OF THE INVENTION

This invention is most useful and has been thoroughly tested in the fabrication of boats which are about 45 feet in length although, within some practical limits, it may be used in boats somewhat shorter or longer than just indicated.

Except with reference to reinforcing means, generally referred to herein as reinforcing stringers, and their characteristics and the means of providing them, the manufacture of a boat according to this invention proceeds very much as such boats have hitherto been fabricated. Thus, there is provided a sturdy mold formed with a hollow having an inner surface of a shape corresponding to the shape of the outer surface of the boat to be built. As such molds are well known to all who are familiar with boat building, the mentioned mold has not been illustrated. However, a portion of a mold wall has been indicated at 10 in FIG. 3.

After the mold's inner surface 10a has been waxed or otherwise been given release treatment to permit the ultimate removal of a finished boat hull from the mold, the formation of the boat hull in the mold may be commenced.

A polyester gel coat 12 is first suitably applied to the mold's inner surface 10a, preferably by spraying, to a thickness of about 20 millimeters. The substance of this coat may be tinted as it will appear as the smoothe outer surface of the finished boat. After the gel coat 12 has been suitably cured, a series of laminations including certain forms of fiber glass are separately applied thereto, progressing inwardly to give the developing boat its desired thickness and strength.

In practicing the present invention, the mentioned laminations are of two principal characteristics, (1) some woven laminations are basically sheets of woven roving fiber glass, preferably of a weight of about 24 ounces per square foot, and (2) some random fiber glass laminations which are a combination of polyester resin, initially in liquid form, intermixed with random strands of fiber glass. These random fiber glass laminations, as hereinafter detailed, are disposed between the woven laminations, and not only contribute to the strength of a finished boat hull, but also serve as filler material for the woven fiber glass sheets and as means for interbonding said sheets.

This invention may best be understood by considering the walls of a finished hull as including two types of areas, (1) greater areas designated 14, 16, 18, and 20 in the drawing, and (2) lesser areas in the form of built-in reinforcing stringers designated 22, 24, 26, 28, 30 and 32. With minor exceptions, these greater and lesser areas extend longitudinally (i.e. fore and aft) of the hull. The exceptions, in the illustrated embodiment, are the stringers 32 and 30, and the area 20 which, absent the stringer 30, would be part of the area 16.

The mentioned greater areas are generally similar in thickness and in the composition, number and disposition of woven and random laminations and of adequate general strength for the hull's wall. The mentioned reinforcing stringers are generally similar to each other cross sectionally, and are in integral, built-in association with the laminations of said greater areas. They are much thicker than the areas 14, 16, 18, and 20, and the laminations therein are about double in number to those in the last mentioned areas. Hence, the stringers 22, 24, 26, 28, 30, and 32 constitute very effective means for reinforcing the hull as a whole; and that reinforcement is provided at areas where the hull is most strongly subjected to water stresses in the use of the boat.

The manner of forming, treating and positioning material constituting the laminations of the boat's hull wall may best be understood by reference to FIG. 3 which, although specifically directed to the association of areas 16 and 18 with reinforcing stringer 26, should also be considered as illustrative of the association of others of the reinforcing stringers with adjoining greater areas of the hull's wall.

Referring to FIG. 3, the entire inner surface of the gel coat 12 is sprayed with a fluid mixture of polyester resin and random strands of fiber glass roving to provide a random lamination 34. Inwardly of that random lamination are plural serially overlaid woven laminations 36, 37, 38, 39, 40, and 41; those marked 36 and 37 respectively having overlapping marginal portions 36m and 37m, those marked 38 and 39 respectively having overlapping marginal portions 38m and 39m, and those marked 40 and 41 respectively having overlapping marginal portions 40m and 41m. All the mentioned overlapping is located approximately equally at opposite sides of a stringer center line marked CL in the drawing; said overlapping area thereby constituting the major characteristic of the reinforcing stringer 26.

It may be seen that the mentioned woven laminations 36, 37, 38, 39, 40, and 41 are interleaved with each other at their mentioned marginal portions 36m, 37m, 38m, 39m, 40m, and 41m. These woven laminations and their marginal portions are integrated by being interbonded by intervening random fiber glass laminations 43, 44, 45, 46, and 47 which are serially sprayed in place following the positioning of each of the woven laminations. As these random laminations fill the interstices of the woven laminations and also serve to interbond the woven laminations, they are relatively thin, and are diagrammatically indicated in FIG. 3 only by the lines which define the woven laminations.

In providing each of the mentioned woven fiber glass laminations (referring to lamination 36–36m as an example), a piece of woven roving fiber glass is cut from a supply sheet of such material. A template is used in such cutting to include not only a main portion 36 generally corresponding in size and shape to the area portion 18 of the developing hull, but also to integrally include marginal portion 36m and an opposite marginal portion (not shown) to serve as part of the reinforcing stringer 28 which extends inside and along the bottom of the boat's keel. Templates are similarly employed in cutting sheets for the other woven laminations to their proper sizes and shapes including their marginal portions which enter into the formation of stringers 22, 24, 28, 30, and 32, in the manner just described with reference to the stringer 26.

The woven laminations are sequentially applied on and inwardly of random lamination 34, in the order 37, 36, 39, 38, 41, 40. Woven lamination 37 is applied upon random lamination 34 while the latter is still tacky or somewhat softer than tacky. Thereafter, the random laminations 43, 44, 45, 46, and 47 are applied separately after each of the woven laminations has been applied, the random laminations each being tacky or somewhat softer than tacky when succeeding woven laminations are applied. One or more additional random and woven laminations may be applied if it is desired that the hull wall including its stringers be additionally strengthened.

The fact that the woven laminations are applied upon underlying tacky material assures that, once properly positioned, the woven laminations will not materially shift. Also, after being properly positioned, each woven lamination is rolled forcefully upon the underlying random lamination, thereby causing the material of the latter to flow into the interstices of the woven lamination.

Woven laminations 40 and 41 with their overlapping marginal portions 40m and 41m may, if desired, be treated as the innermost woven laminations of the hull wall and its stringers, in which event, a coating or further random lamination 48 may be sprayed upon the inner surfaces of said woven laminations as a finishing, inner coating of the hull wall. Optionally, a single woven lamination 42, continuous over the entire inner surface of the hull wall, may be provided over the previously described laminations; said optional lamination being suitably rolled and, if desired, having a finishing random lamination 49 applied thereto to provide suitable finish to the interior of the hull's walls.

After a suitable curing time, the hull may be removed from the mold, complete and of ample strength to withstand all stresses which it may encounter in use.

It may be observed from FIG. 3 that stringer 26, as with other stringers, is thickest at an area adjacent to and at opposite sides of the center line CL; that thick area, in boats of approximately 45 feet in length, preferably being approximately 6 inches in width. At opposite sides of said thick portion, the stringer becomes graduated in thickness to its junctures with the hull portions 16, 18 where it merges into the latter portions at a thickness corresponding to the thickness of said hull portions. Between said junctures, the over all width of the stringer, preferably, is about 12 inches.

The reinforcing stringers curve longitudinally and cross sectionally to conform to the various curves in the boat's wall. Stringer 28, within the boat's keel, overlaps the longitudinal center line of the keel. Stringer 22 becomes graduated in thickness into greater hull area 14, but its thickened area extends straight upwardly into integral association with a fiber glass gunwale strip 50.

The fact that the woven laminations are interbonded by the material of the random laminations, and that said material fills the interstices of the woven laminations, assures against delamination which, if encountered, would greatly weaken and probably cause failure of the hull's wall. Moreover, the overlapping and interleaving of the marginal portions of the woven laminations with associated random laminations provides a tenacious integration of the various reinforcing stringers into the hull's wall. Such integration assures against separation of the stringers from adjacent areas of the hull's wall.

Integrated stringers according to this invention provide a hull wall which is greatly improved over prior arrangements wherein stringers are separately applied and are subject to possible failure resulting from separation of the stringers from the hull's wall.

I claim as my invention:

1. A molded boat hull comprising a wall having a plurality of longitudinally extending greater area portions, and longitudinal reinforcing stringers extending between said greater area portions; said greater area portions comprising plural, interbonded, woven fiber glass laminations, and said stringers being solid, and primarily comprising interleaved, interbonded, opposed marginal areas of pluralities of said fiber glass laminations of each of adjacent ones of said greater area portions.

* * * * *